US006918422B2

United States Patent
Jin (10) Patent No.: US 6,918,422 B2
(45) Date of Patent: Jul. 19, 2005

(54) AUTOMATED TINTING FILM REMOVER FOR VEHICLE WINDOW GLASS

(75) Inventor: Cheol Min Jin, Seoul (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 10/731,966

(22) Filed: Dec. 9, 2003

(65) Prior Publication Data

US 2004/0250397 A1 Dec. 16, 2004

(30) Foreign Application Priority Data

Apr. 23, 2003 (KR) .................................. 10-2003-0025619

(51) Int. Cl.[7] .............................................. B32B 35/00
(52) U.S. Cl. ........................ 156/584; 156/344; 15/93.1; 15/303; 15/306.1; 15/308; 83/465; 83/861
(58) Field of Search ....................... 15/93.1, 303, 306.1, 15/308, 309, 364, 22, 465, 861; 156/344, 584

(56) References Cited

U.S. PATENT DOCUMENTS

| | | | | |
|---|---|---|---|---|
| 3,486,918 A | * | 12/1969 | Motter | 428/426 |
| 4,091,580 A | * | 5/1978 | Oates | 451/41 |
| 5,243,023 A | * | 9/1993 | Dezern | 528/331 |
| 5,449,312 A | * | 9/1995 | Lisec | 451/5 |
| 5,662,762 A | * | 9/1997 | Ranalli | 156/344 |
| 6,319,548 B1 | * | 11/2001 | VanWinckel | 427/154 |
| 6,565,420 B2 | * | 5/2003 | Lisec | 451/38 |
| 2004/0200080 A1 | * | 10/2004 | Lauri | 30/541 |

FOREIGN PATENT DOCUMENTS

| | | |
|---|---|---|
| JP | 09-118546 | 6/1997 |
| JP | 11-267627 | 5/1999 |
| JP | 2001-334248 | 4/2001 |
| KR | 1002363190000 | 9/1999 |
| KR | 1020020013028 | 2/2002 |

* cited by examiner

Primary Examiner—Mark A. Osele
(74) Attorney, Agent, or Firm—Morgan Lewis & Bockius LLP

(57) ABSTRACT

An automated tinting film remover comprises a loading device for moving a vehicle window and locating it at a predetermined position, a securing device with which the properly located vehicle window can be firmly secured, and a removing device for eliminating a tinting film coated on the vehicle window. The removing device comprises a vapor emitting means for weakening the adhesive strength of the tinting film coated on the vehicle window, a cutting means having an electric conductive wire for cutting the tinting film, and a scraping means for peeling off the tinting film, whereby the removal of a tinting film coated on a vehicle window can be conducted in an automated manner with ease.

7 Claims, 8 Drawing Sheets

AUTOMATED TINTING FILM REMOVER FOR VEHICLE WINDOW GLASS

CROSS-REFERENCE TO RELATED APPLICATIONS

This application claims priority of Korean Application No. 10-2003-0025619, filed on Apr. 23, 2003, the disclosure of which is incorporated fully herein by reference.

FIELD OF THE INVENTION

The present invention relates to an automated tinting film remover for vehicle window glass.

BACKGROUND OF THE INVENTION

In general, glass used in an automobile is classified according to its usage, for example, as a windshield, a rear widow, or a side window. When removed from an automobile, if not in a condition for recycling, such glass is often discarded in landfills, which results in environmental contamination because the glass is made of inorganic material. For this reason, various methods for recycling such glass have been developed.

The side window glass is advantageous over the rear window glass or the windshield glass in recycling thereof because generally the windshield glass comprises a thin film in order to prevent the glass from being shattered in the event of an accident and the rear window glass includes an electronic conductive wire for defrosting. Namely, for recycling the rear window glass and the windshield glass, it is necessary to conduct an additional process to remove the thin film and the conductive wire.

Japanese patent publication No. 2001-334248, for example, discloses a method for peeling off the thin film layer made of resin by applying a solution of potassium hydroxide, a solution of sodium hydroxide, a solution of sulfuric acid and peroxide of hydrogen. However, the method is disadvantageous in that complex procedures are required and toxic solutions such as sulfuric acid used must be treated with special caution after use. In the light of the cost and time involved in the additional processing, rear window glass and windshield glass fall into disuse without recycling.

Unlike a rear window glass or windshield glass, a side window glass typically does not include other elements such as an electric conductive wire or thin film, so that the recycling procedure thereof can be simplified in comparison with that of other glass.

For example, Korean patent publication No. 1999-34492 discloses an apparatus for collecting window glass from disused cars, which is comprised of a pneumatic cylinder, a link assembly, and a crusher for breaking the glass into pieces. Moreover, in Korean patent publication No. 2002-13028, another collecting apparatus including a turning device, a crush device having a punch element, and a protector, is disclosed.

However, most of the window glass of the disused cars are coated with a tinting film so as to block sun light. Such tinting film is mostly discolored due to exposure to sunlight so that it is not able to properly serve as a sun screen. In order to recycle such window glass, it is necessary to remove the tinting film attached on the window glass in advance. Namely, an adhesive applied between a window glass and a tinting film must be removed so as to peel off the tinting film from the window glass. In the prior art, the removing method for tinting film comprises steps of weakening the adhesive strength by applying alcohol or acetone on the surface of the tinting film, and peeling off the tinting film by means of a scraper.

However, such removing method according to the prior art includes many complex and labor intensive processes so that it becomes time consuming, resulting in an increase in the cost involved in recycling window glass. In addition, such removing method is disadvantageous in that an operator has to handle chemical compounds during the process.

SUMMARY OF THE INVENTION

In one embodiment, the present invention provides an automated tinting film remover for vehicle window glass comprising a loading device, a securing device and a removing device. The loading device moves a window glass and locates it at a predetermined position. The securing device firmly secures the properly located window glass. The removing device eliminates the tinting film coated on the vehicle window glass. The removing device according to embodiments of the present invention preferably comprises a vapor emitting means for weakening the adhesive strength of the tinting film coated on the vehicle window, a cutting means having an electric conductive wire for cutting the tinting film, and a scraping means for peeling off the tinting film. With such an arrangement, the removal of a tinting film coated on a vehicle window can be conducted in an automated manner with ease.

In a preferred embodiment, a securing device comprises plural supporting elements and securing means. A first supporting element rotates and longitudinally moves by means of a hydraulic device. A U-shaped upper securing means is pivotally coupled to the upper end of the first supporting element so as to pivot on a coupling point. The upper securing means comprises a movable roller and an anti-slip bar. A second supporting element rotates and longitudinally moves also by means of a hydraulic device. A lower securing means includes a plate element and a plurality of pneumatic suction cups mounted on the plate element. The lower securing means is pivotally coupled to the upper end of the second supporting element. A bumper prevents the lower end of a window glass from breaking due to physical shock during a tinting film removing process. The bumper is capable of moving back and forth in accordance with the movement of the lower securing means. In a further preferred embodiment, the movable roller and the bumper are made of a rubber.

In a further preferred embodiment, the removing device comprises a vapor emitting means for spraying high temperature vapor to the tinting film coated on a window glass, a cutting means for cutting the tinting film into fragments, and a scraping means for peeling off the tinting film. The vapor emitting means comprises a plurality of rollers, wherein many nozzles are formed on the surface thereof. The cutting means is comprised of conductive wires that are disposed in the checkered pattern. The scraping means comprises at least two rollers having rough surfaces and an intaking device for gathering the tinting film scraped by the rough surface of the roller.

In a further preferred embodiment, the vapor emitting means, the cutting means, and the scraping means may be installed to a multi-axis robot so that the tools can be readily changed in accordance with the requirement by rotation of the robot.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE PREFERRED EMBODIMENT

Hereinafter, a preferred embodiment of the present invention is described in detail with reference to the accompanying drawings.

As shown in the accompanying drawings, an automated tinting film remover for vehicle window glass according to the preferred embodiment of the present invention comprises a loading device 10 for moving a window glass 12 and locating it into a predetermined position; a securing device 23 with which the properly located window glass 12 can be firmly secured; and a removing device for eliminating a tinting film 13 coated on the window glass.

Figure 1:
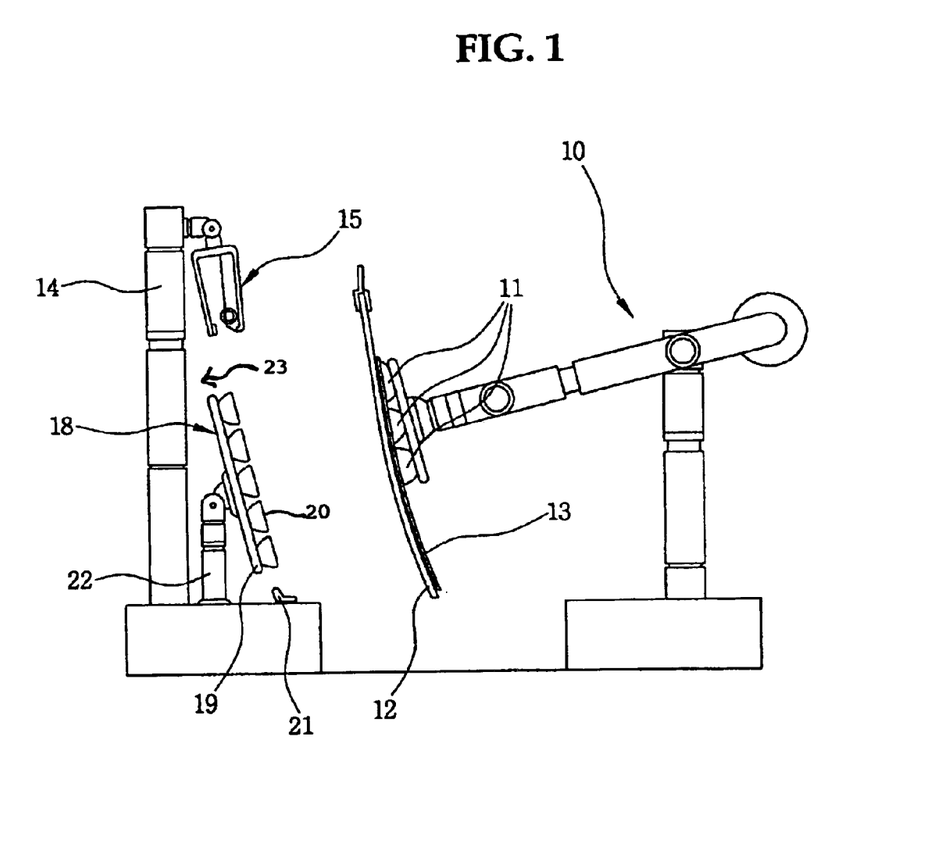
FIG. 1 shows a loading device and a securing device of an automated tinting film remover for vehicle window glass according to an embodiment of the present invention.

As shown in FIG. 1, the loading device 10 transfers a window glass 12 coated with tinting film 13 to the securing device 23. The loading device 10 is provided with a plurality of pneumatic suction cups 11 or other suction means, with which the window glass 12 is firmly attached to the loading device 10 during the transfer thereof.

Figure 2:
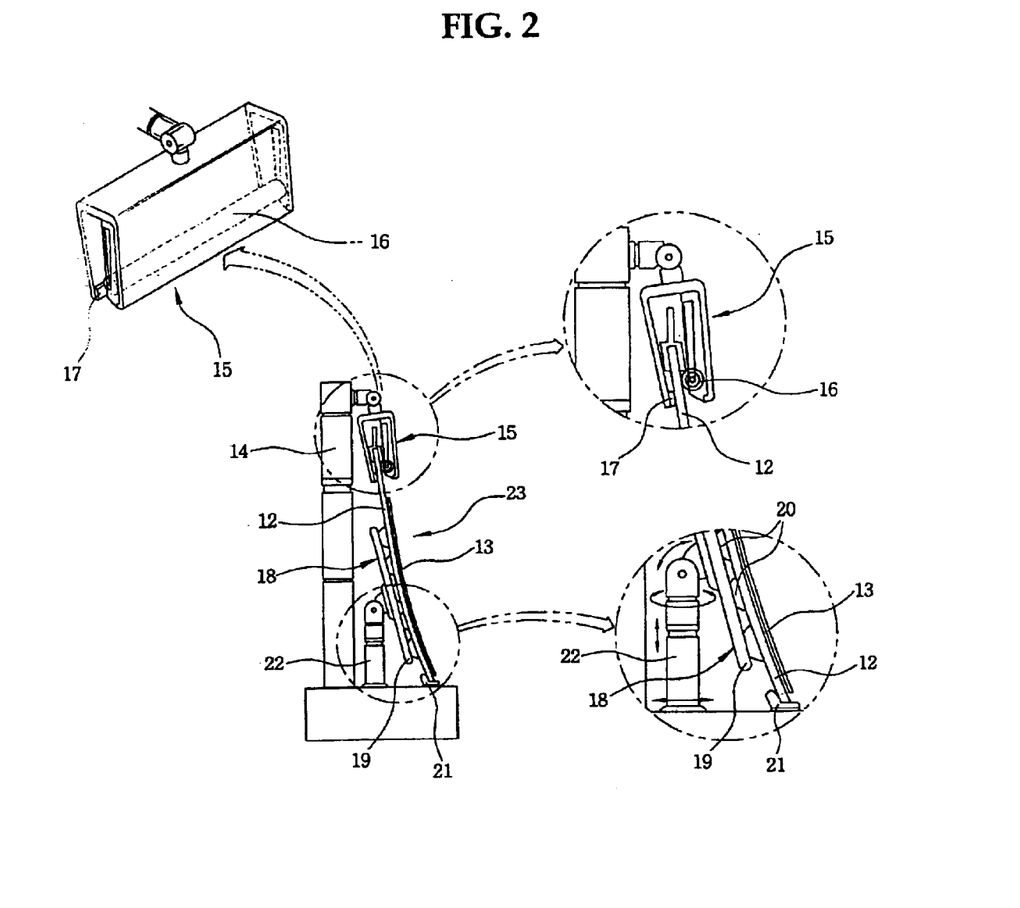
FIG. 2 shows the securing device of FIG. 1 with partially enlarged portions.

The securing device 23 is provided for securing the window glass in the predetermined position, which is transferred by said loading device 10. The securing device 23 is comprised of an upper securing means 15, a lower securing means 18, a first supporting element 14 for supporting the upper securing means 15, a second supporting element 22 for supporting the lower securing means 18, and a bumper 21 made of rubber. The upper securing means 15, substantially having a U-shape, is pivotally connected to the upper end of the first supporting element 14. A movable roller 16 whose surface is coated with rubber material and an anti-slip bar 17 made of rubber are disposed inside the upper securing means 15, so that the window glass 12 can be fixed in the upper securing means 15 by inserting one end of the window glass 12 between the movable roller 16 and the anti-slip bar. The anti-slip bar 17 is disposed in parallel to the movable roller 16.

In the operation of the upper securing means 15, the movable roller 16 is moved upwardly along with the window glass 12 as one end of the window glass 12 is slid into the upper securing means 15. Subsequently, as the window glass 12 is pulled downwardly, the movable roller 16 being moved downward and the anti-slip bar 17 firmly clamp the end of the window glass 12.

The fist supporting element 14 is able to change the height thereof or rotate by using a hydraulic device in accordance with the dimension of the window glass 12 to be accommodated. The upper securing means 15 mounted on the first supporting element 14 is also capable of rotating and pivotally moving on a coupling point. The lower securing means 18 pivotally coupled to the upper end of the second supporting element 22 includes a plate element 19 and a plurality of pneumatic suction cups 20 the same as those of the loading device 10. With the structure, the lower securing means 18 firmly holds the window glass 12 with suction on a substantial portion of the window glass 12. Moreover, the height or the angle of the lower securing means 18 can be adjusted in accordance with the dimensions of the window glass 12 inserted into the upper securing means 15. Namely, the lower securing means 18 can readily accommodate any shapes of glass types therein.

Figure 3:
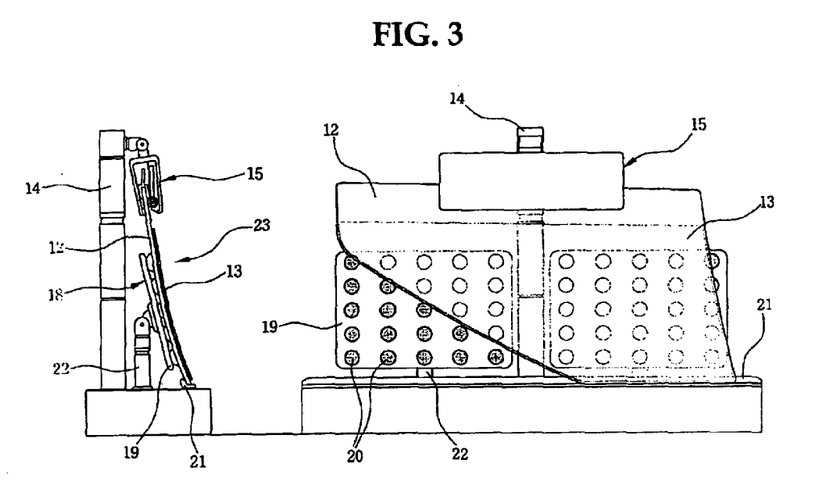
FIG. 3 shows both a front view and a separate side view of the securing device of FIG. 2, with which a window glass is fixed.

Furthermore, the bumper 21 made of rubber is installed to the substrate of the portion of the securing device 23, where the lower end of the window glass 12 secured by the upper securing means 15 and the lower securing means 18 is positioned, so that the damage to the lower end of the window glass 12 cause by vibration of peeling operation can be effectively prevented. The bumper 21 is movable along with the lower securing means 18 in accordance with the dimension of the window glass 12. As shown in FIG. 3, the upper end, the center portion, and the lower end of the window glass 12 are held by the upper securing means 15, the lower securing means 18, and the bumper 21, respectively.

Figure 4:
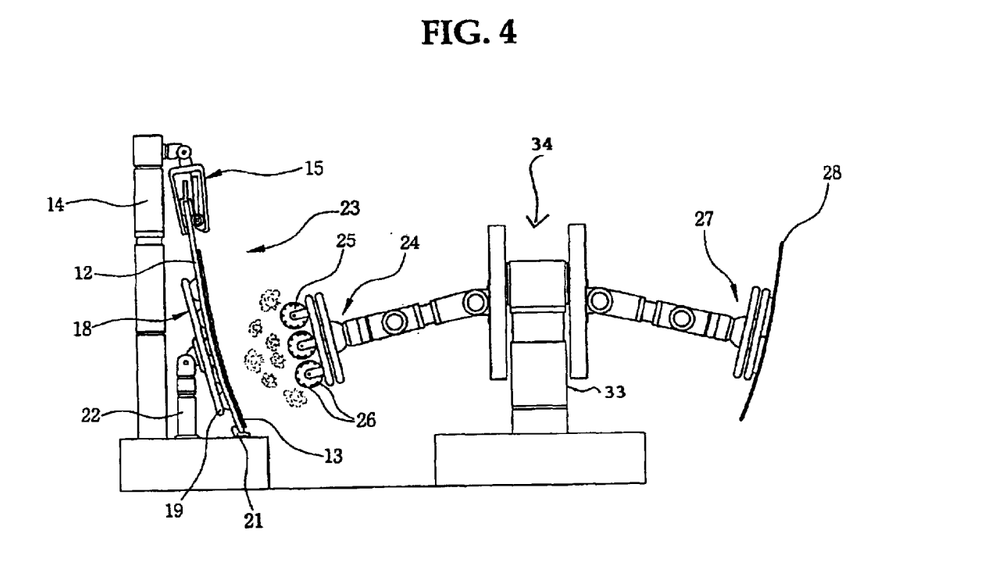
FIG. 4 shows a vapor emitting means and a cutting means of an automated tinting film remover for vehicle window glass according to an embodiment of the present invention.
Figure 6:
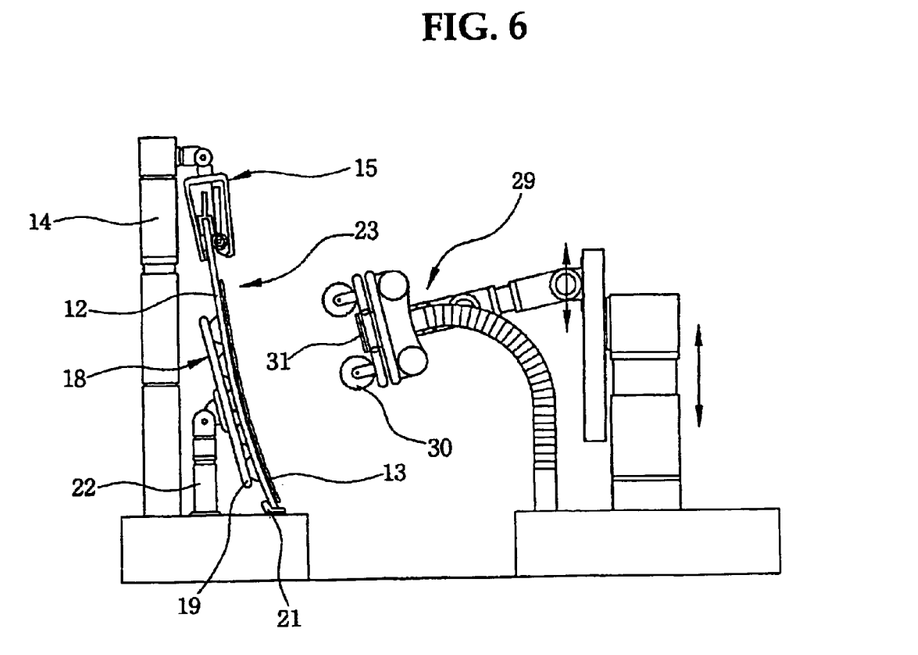
FIG. 6 shows a scraping means of an automated tinting film remover for vehicle window glass according to an embodiment of the present invention.

In the preferred embodiment of the present invention, as shown in FIG. 4 and FIG. 6, the removing device 34 for eliminating a tinting film 13 coated on the window glass 12 comprises a vapor emitting means 24, a cutting means 27, and a scraping means 29. Preferably, the vapor emitting means 24 and a cutting means 27 may be incorporated into one multi-axis robot 33.

The vapor emitting means 24, for weakening the adhesive strength of the tinting film 13 coated on the window glass 12, includes a plurality of cylindrical rollers 25 capable of free rotation and many nozzles 26 formed on the surface of each roller 25 through which vapor is emitted at the temperature of approximately 200° C. During the operation, the roller 25 continuously rotates while the nozzles 26 are emitting the vapor to the tinting film 13 in order to weaken the adhesive strength between the tinting film 13 and the window glass 12.

For expediting exfoliation of the tinting film 13, the cutting means 27 is provided. Cutting means 27 facilitates the vapor generated by the vapor emitting means 24 in penetrating into the gap between the window glass 12 and tinting film 13 by cutting the tinting film 13 into fragments. The cutting means 27 is comprised of conductive wires 28 disposed in checkered pattern.

Figure 5:
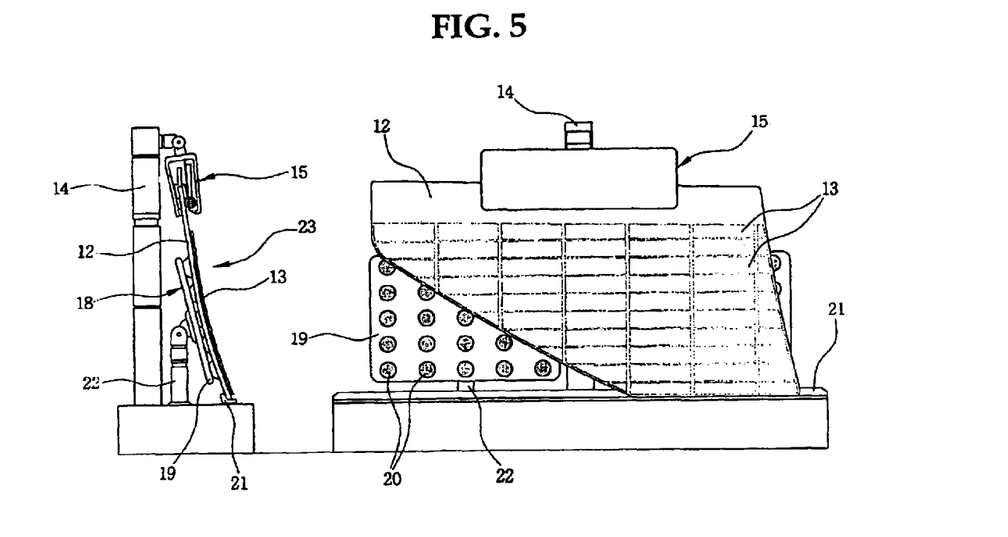
FIG. 5 shows both a front view and a separate side view of a securing device and a window glass fixed by the securing device, wherein a tinting film attached on the surface of the window glass is cut by a cutting means and a vapor emitting means of FIG. 4.

As shown in FIG. 5, the tinting film 13 coated on the surface of the window glass 12 is cut into several pieces of fragments by the cutting means 27. The effect of weakening the adhesive strength of the tinting film 13 can be maximized by emitting the high temperature vapor after the cutting procedure because the vapor easily penetrate into the gap between the window glass 12 and tinting film 13 through the cut line formed by the conductive wire 28.

Figure 7:
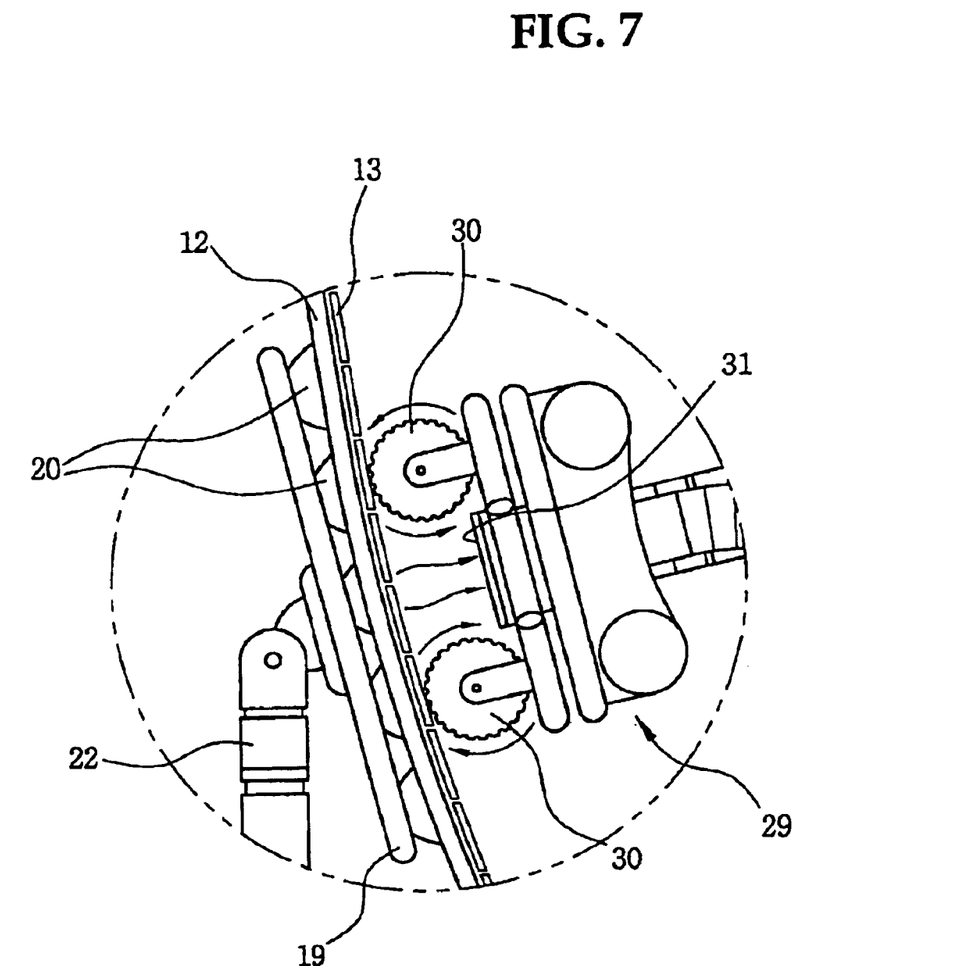
FIG. 7 is a partially enlarged figure showing the operation of a scraping means automated tinting film remover for vehicle window glass according to an embodiment of the present invention.

The scraping means 29 for finally peeling off the tinting film 13 from the window glass 12 comprises at least two rollers 30 having rough surface and an intake device 31 for gathering the tinting film 13 scraped by the rough surface of the roller 30. In the operation, the tinting film 13 is peeled off by rotation of the roller 30 and is then suctioned by the intake device 31. The gathered tinting film 13 is finally transferred to a reservoir (not shown in Figs.) The rollers 30 rotate in opposite direction with each other, namely, the two rollers 30 rotate inwardly such that the scraped tinting film 13 and/or adhesive are moved to the intake device 31.

Even though the foregoing preferred embodiment of the present invention discloses a cutting means and a vapor emitting means that are separated from a scraping means, as will be appreciated by those skilled in the art, it is possible to incorporate those into one multi-axis robot.

Figure 8:
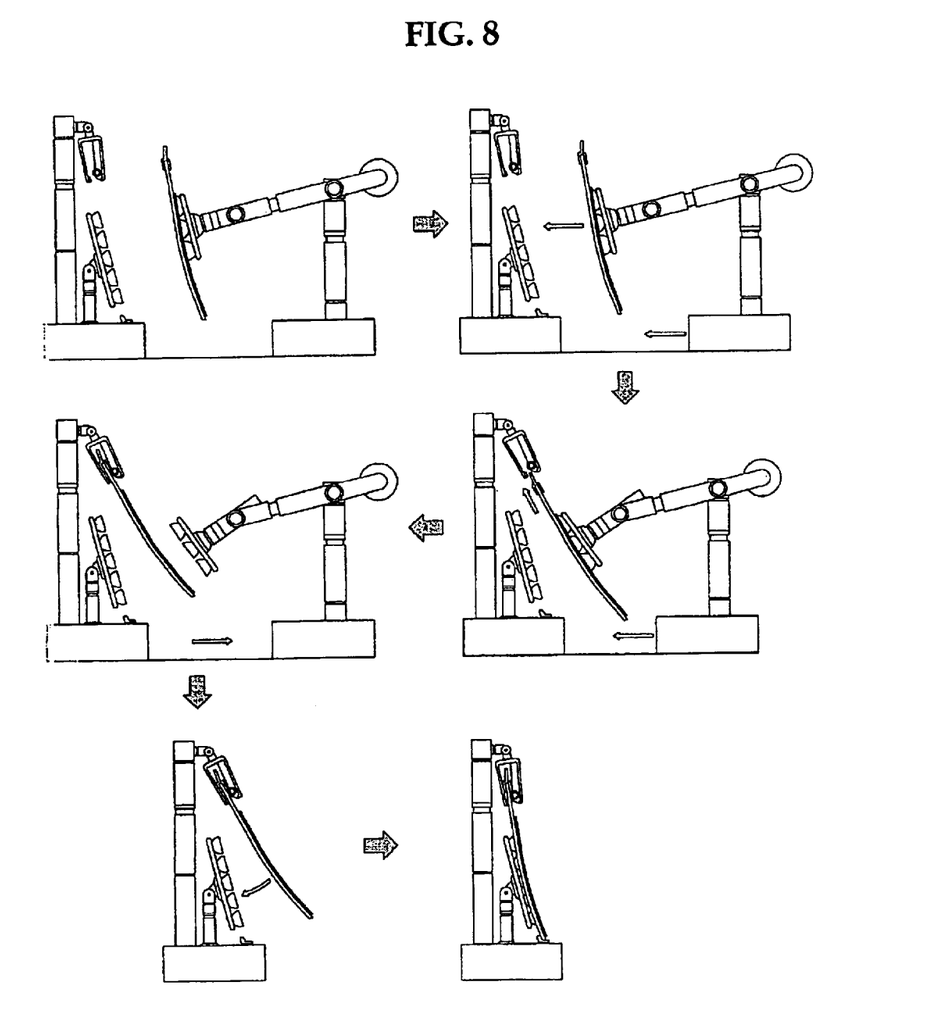
FIG. 8 shows the operation of a loading device and a securing device of an automated tinting film remover for vehicle window glass according to an embodiment of the present invention.
Figure 9:
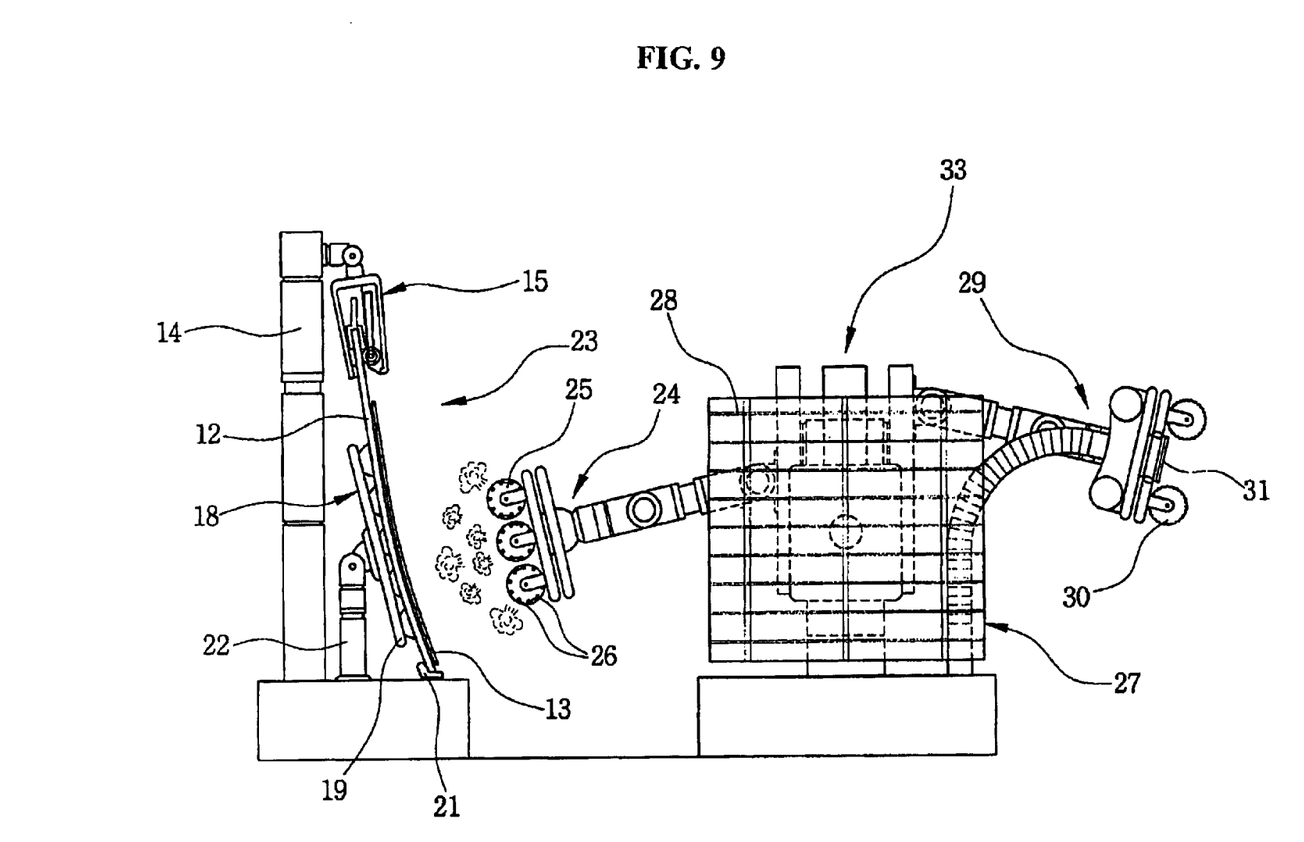
FIG. 9 is a side view of the securing device and removing device according to an embodiment of the invention.

A method according to the present invention for removing the tinting film of a disused car comprises loading a window glass 12 of a disused car into the securing device 23 by using the loading device 10 as shown in FIG. 8; removing the tinting film coated on the surface of the window glass 12 by using the vapor emitting means, the cutting means, and the scraping means; and unloading the window glass 12 from the securing device 23 by using the loading device 10 in the reverse way of the loading procedure.

According to the present invention, it is possible to easily remove a tinting film coated on the window glass of a disused car in a fully automated manner so that the cost and the labor involved in the procedure will significantly reduced, which potentially results in increasing the recycling rate.

Even though the present invention is described in detail with reference to foregoing embodiments, it is not intended to limit the scope of the present invention. It is evident from the foregoing that many variations and modifications may be made by a person having an ordinary skill in the present field without departing from the essential concept of the present invention.

What is claimed is:

1. An automated tinting film remover for vehicle window glass, comprising:
    a loading device having a plurality of pneumatic suction means for moving and locating the window glass at a predetermined position;
    a securing device for firmly securing the window glass transferred by said loading device; and
    a removing device for eliminating a tinting film coated on the window glass, said removing device comprising a vapor emitting means, a cutting means, and a scraping means.

2. An automated tinting film remover according to claim 1, wherein the securing device comprises:
    a first supporting element capable of rotating and longitudinally moving by means of a hydraulic device;
    a U-shaped upper securing means pivotally coupled to an upper end of said first supporting element so as to pivot on a coupling point, the upper securing means comprising a movable roller and a anti-slip bar;
    a second supporting element capable of rotating and longitudinally moving by means of a hydraulic device;
    a lower securing means including a plate element and a plurality of pneumatic suction means mounted on the plate element, the lower securing means being pivotally coupled to an upper end of said second supporting element; and
    a bumper for preventing a lower end of the window glass from being broken due to vibration during a tinting film removing process, the bumper capable of moving back and forth in accordance with the movement of said lower securing means.

3. An automated tinting film remover according to claim 2, wherein the movable roller, the anti-slip bar, and the bumper are made of rubber.

4. An automated tinting film remover according to claim 1, wherein the vapor emitting means comprises a plurality of cylindrical rollers capable of free rotation and a plurality of nozzles formed on surfaces of said rollers.

5. An automated tinting film remover according to claim 1, wherein the cutting means for cutting the tinting film coated on the window glass comprises conductive wires disposed in a checkered pattern.

6. An automated tinting film remover according to claim 1, wherein the scraping means for peeling off the tinting film coated on the window glass comprises at least two rollers having rough surfaces and an intake device for gathering the tinting film scraped by the rough surfaces of said rollers.

7. An automated tinting film remover according to claims 1, wherein the vapor emitting means, the cutting means, and the scraping means are incorporated into a multi-axis robot so that those can be readily exchanged with each other in accordance with the requirement by rotation of the robot.

* * * * *